April 21, 1953  C. J. McKINNEY  2,635,915
WINDOW GUIDE STRIP CONSTRUCTION
Filed Sept. 8, 1950  2 SHEETS—SHEET 1
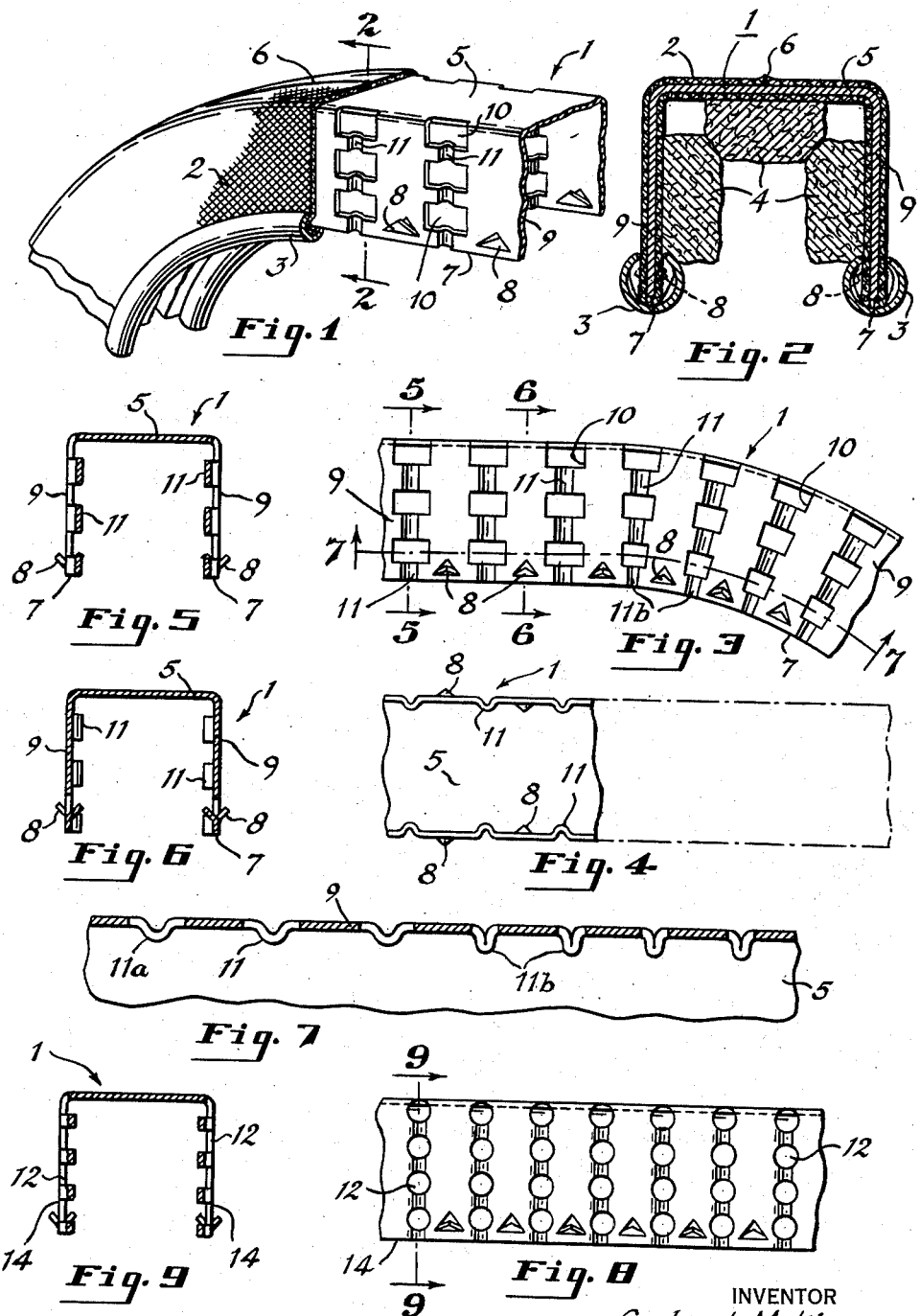
INVENTOR
Carlos J. McKinney
BY Evans + McCoy
ATTORNEYS April 21, 1953        C. J. McKINNEY        2,635,915

WINDOW GUIDE STRIP CONSTRUCTION

Filed Sept. 8, 1950        2 SHEETS—SHEET 2

INVENTOR
Carlos J. McKinney
BY Evans + McCoy
ATTORNEYS

Patented Apr. 21, 1953

2,635,915

UNITED STATES PATENT OFFICE 2,635,915

WINDOW GUIDE STRIP CONSTRUCTION

Carlos J. McKinney, Detroit, Mich., assignor to The General Tire and Rubber Company, Akron, Ohio, a corporation of Ohio Application September 8, 1950, Serial No. 183,779

11 Claims. (Cl. 296—44.5)

This invention relates to a flexible strip construction for window channels and guide strips for use in automobile windows and the like. It particularly relates to a strip which is bendable to various window frame shapes and at the same time is strong and rigid.

Window channels and guide strips are used in the window frames of automobile bodies to guide and hold the window glass which slides up and down therein. They are generally formed from sheet metal covered with a suitable facing fabric or material. They must be readily bendable to the shape of the window frame to which they are applied and at the same time be strong once formed. Various channel constructions have been developed to solve this problem, but in general the channels are either too weak to provide the needed guide and support or are too rigid and crimp and wrinkle when bent for conformation with the window frame.

Accordingly, one object of the present invention is to provide a strong and durable window channel and window strip construction capable of bending as necessary without distortion.

This is accomplished by forming regularly spaced openings or holes in the side walls of the channel and in the body of the window strip and bowing the connecting portions between them inwardly or outwardly so that the connecting portions absorb compressive forces and the channel or strip is easily bent around contours.

Another object of this invention is to provide continuous edges and eliminate the necessity of slitting the channel or strip walls to permit bending. The regularly spaced openings and bowed connecting portions of this invention give the desired flexibility while at the same time providing continuous edges.

A further object of the invention is to provide a simple and economical method of forming a bendable channel or strip of the type referred to.

With the above and other objects in view the invention may be said to comprise the weather or trim strip as illustrated in the accompanying drawings and hereinafter described, together with such variations and modifications thereof as will be apparent to one skilled in the art to which the invention pertains.

Reference should be had to the accompanying drawings forming a part of this specification in which like numerals refer to like parts:

Figure 1 is a perspective view of the channel of this invention with the outer fabric covering removed from part of the channel to show the construction of the channel walls;

Fig. 2 is an enlarged cross-sectional view taken along line 2—2 in Fig. 1 to show the cross-sectional construction of the channel;

Fig. 3 is a side view of a channel uncovered by fabric and bent, for example, as for an automobile window frame;

Fig. 4 is a bottom plan view of the bent channel of Fig. 3;

Fig. 5 is a cross-sectional view taken along line 5—5 in Fig. 3 showing the channel construction through the bowed-in straps and square openings;

Fig. 6 is a cross-sectional view taken along line 6—6 in Fig. 3, showing the channel construction through the solid portion of the channel;

Fig. 7 is an enlarged bottom plan, sectional view taken or developed along line 7—7 of Fig. 3 showing how the bowed-in straps are distorted over the contour bend;

Fig. 8 is a side elevation view of a modification of the invention in which the side openings are circular;

Fig. 9 is a cross-sectional view taken along line 9—9 in Fig. 8 through the circular openings to show the channel construction;

Figure 10:
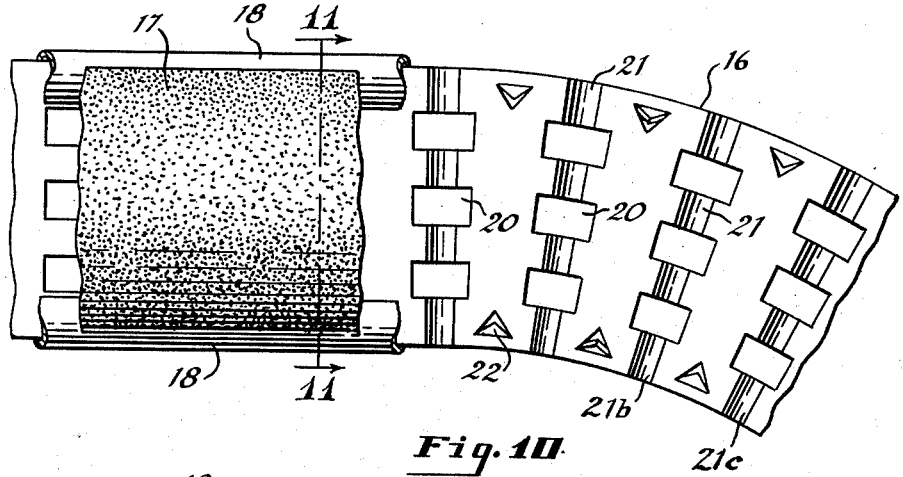
Fig. 10 is an enlarged plan view of a window guide strip embodying this invention with the cushion removed over the right hand bent portion to show how the bowed-in straps are distored.

The window channel and window guide strip of this invention are characterized by a body portion which has sets of regularly spaced openings with the connecting strap portions between the openings of each set partially bowed-in. Thus when the channel or strip is bent, the bowed-in portions bend or distort further along the inside of the curve to absorb the compressive forces created by bending the strip.

The window channel of the present invention illustrated in Figs. 1–10 has a body portion 1 formed or bent into channel shape from sheet metal strip, a fabric cover 2 over this body portion, metal beads 3 over the channel edges, and felt pads 4 along the inner faces of the channel to brace and cushion the window glass.

The metal body portion or frame 1 is covered with an inexpensive durable fabric 2 which is specially made and readily available for this use.

The fabric is of one piece and is wrapped around the body portion and cemented or adhered to the body portion along the bottom at the joint 6 shown in Figs. 1 and 2.

Along the inside of the channel, felt strips or pads 4 are cemented or sewed to the fabric cover. These pads or cushioning means 4 guide and align the window glass as it slides up and down in the runway. If desired, tufted fabric may be substituted for the pads.

Over the open edges 7 of the body portion are disposed hollow linear beads or trim portions 3 made of thin gauge sheet metal formed into C sectioned or bead-shaped linear strips. These beads or trim portions 3 are slidable along the edges of the channel so that they do not ruffle the fabric or otherwise interfere with bending of the channel. To hold these beads over the channel edges, triangular shaped lugs or ears 8 are punched out of the edge portions of the channel body. These lugs or retaining means 8 extend alternately outward and inward from the body walls. The vertex of each triangle is pointed toward the plane of the body bottom 5 so that the bead 3 can fit over it and then cannot be removed. In this way the bead fits securely over the channel edge 7 and at the same time is slidable with it.

One of the principal features of this invention lies in the construction of the channel shaped or U-shaped body portion 1. This body portion or channel frame 1 is of a sheet metal strip formed into a channel shape. The body portion walls 9 (Figs. 1 to 7) and 14 (Figs. 8 and 9) are perforated or provided with regularly spaced openings. These openings or perforations are rectangular 10 (Fig. 3) or round 12 (Fig. 8) in shape and so spaced that each set of openings is disposed in a common cross-sectional plane perpendicular to the channel strip walls, such as plane 5—5 in Fig. 3, which planes are regularly spaced. The modification of Figs. 1–7 employs rectangular openings 10, while the modification of Figs. 8 and 9 employs round openings 12. Other shapes, such as oval openings, are equally serviceable and are contemplated by this invention.

The sets or groups of openings in one channel wall correspond to a similar set or group in the opposite wall. Thus, the set of openings intersected by plane 5—5 in the inside or righthand or facing wall of the channel body aligns with the openings in the outside or lefthand wall as shown in Fig. 5. Likewise, the set of perforations intersected by plane 9—9 in Fig. 8 in the inside wall aligns with a set in the opposite or outer wall. In order to so align the openings or perforations, the openings are formed in a flat metal strip with a die or tool and then the strip is bent into channel form. The preferred construction is one in which the openings in both walls correspond and are aligned as shown in the drawings. This avoids the undesirable longitudinal twist which results when a channel is bent which has no correspondence between the sets of openings in one wall and the sets of openings in the opposite wall.

In order to absorb compressive forces, the metal portions or straps 11 adjacent the perforations are dished or bowed slightly inward as shown. The dish can be inward or outward, the important point being that the strap be slightly distorted or bent in fabrication so that when the channel is bent or shaped to a contour these straps 11 will further distort to absorb the compressive forces. The dish or bow in each strap is in the cross-sectional plane to the body portion or in the plane perpendicular to said body portion walls in order to absorb and bend further with the compressive forces developed in bending the channel. This action is illustrated in the developed bottom plan view of a bent channel in Fig. 7. Here the strap or connecting portion 11a in the straight section of the channel retains its original bowed-in shape while the strap 11b at the bent section of the channel bows or buckles in further to absorb the compressive forces developed in the side wall by the bend.

The extent of the inward bend or bow of the metal straps 11 is revealed in Figs. 5 and 6 taken across a channel as noted. These figures also show the relative size of the straps and the perforations or openings. This relation depends upon the thickness or gauge of the metal and the degree of bending contemplated.

Figure 11:
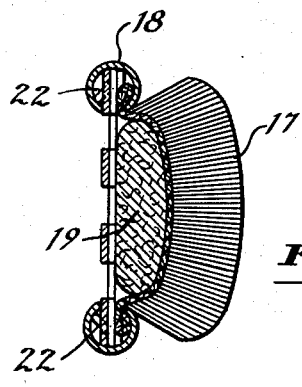
Fig. 11 is a cross-section taken along line 11—11 in Fig. 10 to show the construction of the window guide strip.
Figure 12:
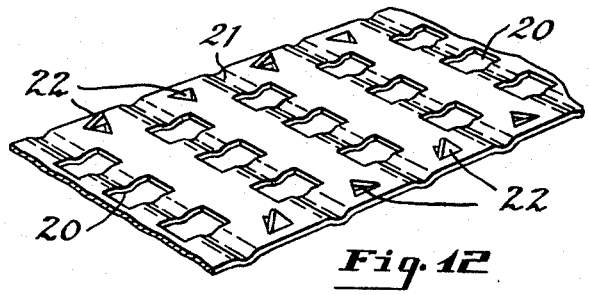
Fig. 12 is a perspective view of the guide strip with the cushion removed to show the strip's construction.

The window guide strip of the present invention illustrated in Figs. 10–12 features a body portion 16, a cushion 17, beads 18 along both edges of the guide strip, and stuffing 19 between the cushion and body portion of the guide strip.

The body portion or frame 16 is thin gauge strip metal characterized by openings or holes 20 evenly arranged in sets along the length thereof. These holes or perforations 20 can be squared or round or of any convenient shape. They are arranged in evenly spaced sets each disposed at a right angle to the line or length of the strip, as shown. The connecting portions or straps 21 adjacent and separating these holes are bent or bowed inward as in the window channel. These straps 21 can be bent or dished inward or outward as desired and should be bent on an axis at right angles to the line of the guide strip.

When the strip is formed around a curve, the bowed-in straps on the inner radial curve distort further as at straps 21b, and 21c while the straps on the outer radial curve are unchanged or flattened out. In this way the forces generated in the strip by bending are easily absorbed and the strip itself is still strong and durable. The strip also has the advantages of a continuous edge and a simple construction.

The cushioning means or tufted cushion 17 is held out in position by the pad or stuffing 19 which is usually felt or sponge rubber and is held or clamped along the edges by the beads 18. The hollow linear beads or trim portions 18 are in turn held on by the lugs or ears 22. These lugs or retaining means are triangular shapes punched from the edge portions of the strip and function similarly to those along the window channel edges.

This guide strip embodies features concerned with the openings and dished strap structures similar to those of the window channel strip and has similar advantages. The construction shown is serviceable for windows on automobiles, busses, and airplanes. Furthermore, the structure itself is not limited to window stripping and can be employed wherever a light, strong, flexible strip is desired.

Having thus fully described my invention, its utility, and mode of operation, what I claim is:

1. A flexible guide strip comprising a body portion, cushioning means along at least one side of said body portion, linear beads over the open edges of said body portion, and retaining means for said linear beads along the open edges of said body portion, said body portion having transversely aligned sets of spaced perforations with the connecting portions adjacent the perforations of each set being bowed in the cross-sectional plane of said guide strip.

2. A flexible guide strip comprising a body portion, cushioning means on one side of said body portion, stuffing between said cushioning means and body portion, trim portions over the open edges of said body portion, and retaining means for said trim portions, said body portion having transversely aligned sets of spaced openings with the connecting portions adjacent the openings of each set being dished in the cross-sectional plane of said guide strip.

3. A window runway strip comprising a frame of flat strip material with evenly spaced sets of holes therein aligned with the cross-sectional axis of said frame, a tufted cushion on one side thereof, hollow linear beads over the open edges of said frame, and lugs punched out along the edge portions of said frame to retain said hollow linear beads, said frame having the straps adjacent the holes of each set dished on an axis at right angles to the longitudinal axis of said strip.

4. A flexible window channel comprising a channel-shaped body portion, a fabric covering the inside and outside of said body portion, cushioning means along the side walls and bottom of said channel, linear beads over the open edges of said body portion, and retaining means for said linear beads along the open edges of said body portion walls, said body portion having spaced transversely aligned sets of perforations in the side walls with the connecting portions adjacent the perforations of each set being bowed in the cross-sectional planes of said channel.

5. A flexible window strip comprising a channel-shaped frame, a fabric covering the inside and outside of said frame, cushioning means along the inside walls and bottom of said frame, linear beads over the open edges of the walls of said frame, and retaining means for said linear beads along the open edges of said frame, said frame walls having formed therein sets of perforations in the cross-sectional plane of the frame with each set of perforations in one wall aligned with a corresponding set of perforations in the opposite wall and with the connecting portions adjacent the perforations of each set being uniformly and regularly inwardly bent.

6. A flexible window channel comprising a channel-shaped body portion, a fabric covering over the inside and outside of said body portion, cushioning means along the inside walls and bottom of said channel, ears formed from the body portion walls extending alternately inwardly and outwardly along the open edges of said body portion walls, and hollow linear beads fitted over the open edges and ears of said body portion walls and longitudinally slidable therewith, said body portion having spaced corresponding transversely aligned sets of openings in the walls thereof with the straps adjacent the openings of each set being inwardly bowed in the cross-sectional planes of said channel.

7. The window channel of claim 3 in which the openings are rectangular.

8. A frame for a flexible window guide strip which is channel-shaped and has corresponding transversely aligned sets of perforations in the channel walls with the connecting portions adjacent the perforations of each set being uniformly inwardly bent.

9. A flexible window channel comprising a channel-shaped body portion, a fabric covering the inside and outside of said body portion, cushioning means along the side walls and bottom of said channel, linear beads over the open edges of said body portion, and retaining means for said linear beads along the open edges of said body portion walls, said body portion having spaced transversely aligned sets of perforations in the side walls with the connecting portions adjacent the perforations of each set being initially bowed from the plane of the side walls of the channel-shaped body portion.

10. The window channel of claim 9 in which the perforations in the sidewalls are rectangular.

11. The window channel of claim 9 in which the perforations in the sidewalls are round.

CARLOS J. McKINNEY.

References Cited in the file of this patent

UNITED STATES PATENTS

| Number | Name | Date |
|---|---|---|
| 1,867,313 | Gaines | July 12, 1932 |
| 2,299,595 | Rydquist | Oct. 20, 1942 |
| 2,428,006 | Best | Sept. 30, 1947 |
| 2,443,959 | Merrill | June 22, 1948 |
| 2,446,516 | Bailey | Aug. 11, 1948 |